Nov. 8, 1927. 1,648,114

G. P. S. CROSS

MECHANICAL MOVEMENT

Filed April 19, 1924   2 Sheets-Sheet 1

INVENTOR-
Garrett P. S. Cross
By his Attorney
Nelson M. Howard

Nov. 8, 1927.  1,648,114
G. P. S. CROSS
MECHANICAL MOVEMENT
Filed April 19, 1924   2 Sheets-Sheet 2

INVENTOR-
Garrett P. S. Cross
By his Attorney,
Nelson W. Howard

Patented Nov. 8, 1927.

1,648,114

UNITED STATES PATENT OFFICE.

GARRETT P. S. CROSS, OF GRAND RAPIDS, MICHIGAN, ASSIGNOR TO UNITED SHOE MACHINERY CORPORATION, OF PATERSON, NEW JERSEY, A CORPORATION OF NEW JERSEY.

MECHANICAL MOVEMENT.

Application filed April 19, 1924. Serial No. 707,744.

This invention relates to mechanical movements and is herein illustrated as embodied in a device for transmitting rotary motion.

The use of intermeshing gears for transmitting rotation at high speed is sometimes unsatisfactory on account of the noise and vibration caused by the wearing of the gears at their points of contact with one another.

In view of this and other considerations, one object of the present invention is to provide a practical power transmitting mechanism which will operate smoothly and quietly at high speed and which will not be subject to wear in such a way as to interfere to any appreciable extent with its smoothness of operation after long use of the mechanism.

With this object in view, one feature of the invention consists in the provision of an improved device of the type referred to comprising a driving element, a plurality of driven elements, and transmission mechanism including a member movable through an orbital path for driving one of the driven elements at the speed of the driving element and the other of the driven elements at a different speed from that of the driving element.

As herein illustrated, a driving shaft and a driven shaft are arranged in spaced end-to-end relation with their axes out of alinement but parallel to each other. Surrounding the main driven shaft is a hollow driven shaft or sleeve which is eccentric to both the driving shaft and the main driven shaft, and interposed between the proximate ends of the driving shaft and the hollow driven shaft is a floating transmission member connecting said shafts as two shafts are commonly connected by the intermediate member of an Oldham coupling. With this arrangement the transmission member is constrained to rotate about its own axis in unison with the rotation of the driving shaft and, in addition, it is constrained to revolve bodily through a circular orbit at the rate of two orbital revolutions for each rotation about its axis. The axial center of the floating member is connected by a crank with the main driven shaft so that each orbital movement of said member is effective to turn the main driven shaft through one revolution in the same direction as the driving shaft and at twice the speed of the driving shaft. By utilizing the shaft connected with the crank as the driving shaft, however, the shaft at the opposite side of the floating member may be driven at one-half the speed of the driving shaft.

The invention further consists in features of construction and combinations of parts hereinafter described and claimed, the advantages of which will be apparent from the following description.

Referring now to the accompanying drawings.

Figure 1:
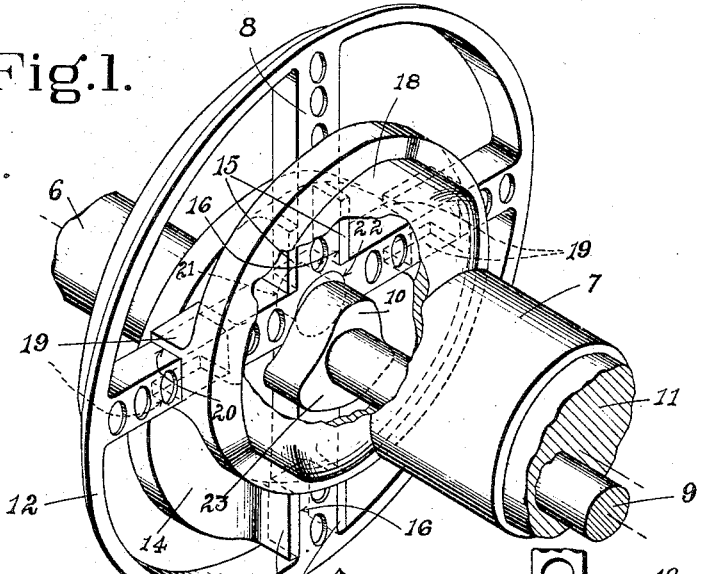
Figure 1 is a perspective view, partly broken away, showing a preferred embodiment of the present invention.
Figure 2:
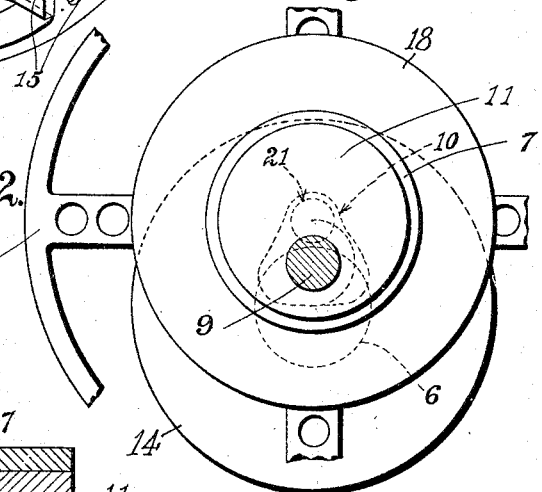
Fig. 2 is an end elevational view, partly broken away, of the device shown in Fig. 1.
Figure 3:
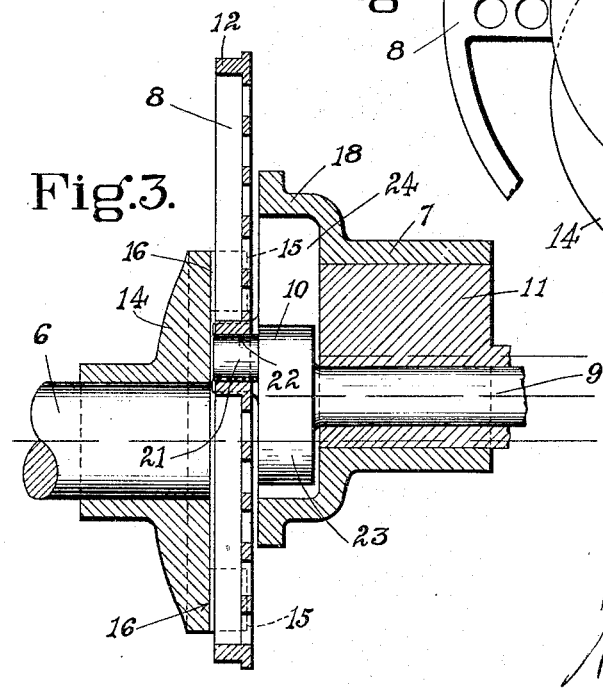
Fig. 3 is a view in central vertical section of said device.

In the drawings, the driving shaft is indicated at 6, the hollow driven shaft or sleeve at 7, the interposed transmission member at 8, the main driven shaft at 9, and the crank connecting the transmission member and the driven shaft at 10. The driving shaft 6 may be the armature shaft of a motor, or it may be connected with any other suitable source of power and journaled in suitable bearings. The hollow driven shaft 7 is mounted to rotate upon a fixed cylindrical bearing stud 11, the common axis of said stud and said hollow driven shaft being offset from but parallel to the axis of the driving shaft, and said shafts being spaced apart in an axial direction to receive the transmission member 8 between them. The transmission member 8 comprises a central portion of cruciform shape having two arms intersecting at right angles. To increase the rigidity of the transmission member 8, the intersecting arms thereof are made U-shaped in cross-section and they are reinforced by means of a ring 12 which connects their outer ends. As shown, the arms of the transmission member are perforated to lessen their weight. The transmission member 8 is located between the proximate ends of the shafts 6 and 7 and is disposed in a plane perpendicular to the axes of said shafts.

Secured to one end of the driving shaft 6 is a disk-like head 14, and projecting from one side of the head 14 are two pairs of spaced ribs 15, 15, said pairs of ribs being located at diametrically opposite sides of the driving shaft and being arranged to provide longitudinally alined guideways 16, 16, in which is slidably interfitted one of the cross-arms of the transmission member. A head 18, formed integrally at one end of the hollow shaft 7, carries two pairs of spaced ribs 19, 19 similar to the ribs 15, 15, and similarly arranged upon the head 18 to provide longitudinally alined guideways 20, 20 for slidably receiving the other cross-arm of the transmission member 8. The main driven shaft 9 extends through the fixed bearing stud 11, said shaft being parallel to the shafts 6 and 7 and being spaced midway between the axes of said shafts. The crank 10 is formed integrally with the main driven shaft 9 and carries a crank pin 21 which is received in a bearing socket 22 in the center of the transmission member 8. The crank 10 is extended at the opposite side of the shaft 9 from the crank pin 21 to provide a counterweight 23 for counterbalancing the weight of the transmission member with respect to the driven shaft 9. The head 18 is axially recessed, as shown at 24, to provide clearance for the rotating crank 10.

Figure 4:
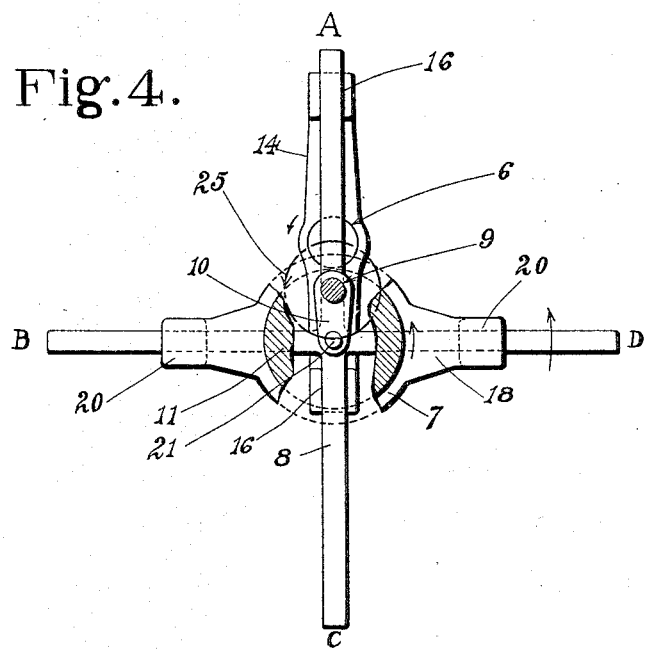
Figs. 4 and 5 are conventional views illustrating different positions of the transmission member relatively to the driving and driven shafts.
Figure 5:
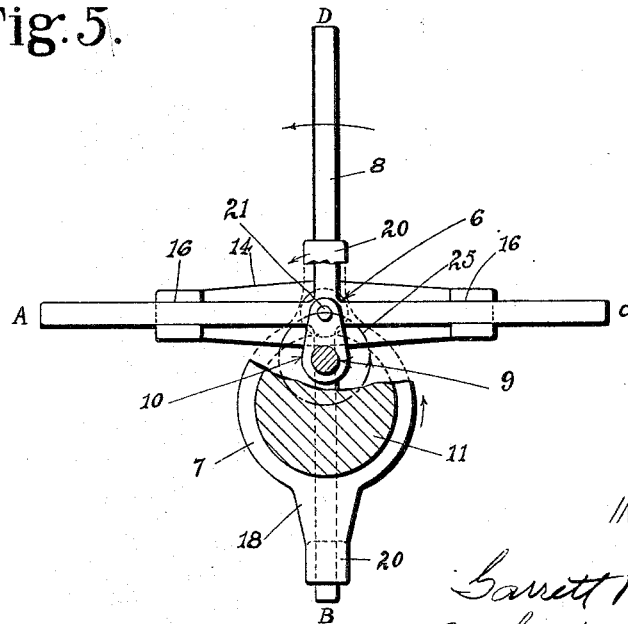

In operation, the transmission member 8, being slidably connected with the driving shaft 6, as described, is caused to rotate upon the crank pin 22 in unison with said shaft. The hollow driven shaft 7, being slidably connected, as described, with the transmission member 8, is caused to rotate in unison with said member and with the driving shaft 6. As the transmission member 8 turns upon the crank pin, it necessarily slides bodily with respect to each of the heads 14 and 18 in a plane at right angles to the axes of the shafts 6 and 7 and by virtue of the perpendicular arrangement of the cross-arms of the transmission member, the sliding movement of said member relatively to one head is at right angles to the sliding movement of said member relatively to the other head. The result of this compound sliding movement of the transmission member is a motion of revolution of said member through a circular orbit described about an axis parallel to the axes of the shafts 6 and 7 and equidistant from said axes, the transmission member being constrained to travel through its orbit twice for each single rotation of said member about the crank pin 21. This fact will be clearly apparent from an examination of Figs. 4 and 5, which illustrate the movement of the crank pin 21 and the transmission member 8 caused by a quarter turn of the driving shaft. As shown by the relative positions of the conventionalized head 14 in Figs. 4 and 5, the driving shaft 6 has been rotated through 90 degrees in a counter-clockwise direction. The transmission member 8 and the hollow head 7 have likewise been rotated through 90 degrees as indicated by the relative locations of the reference letters A, B, C, D, designating the four extremities of the arms of the transmission member and by the relative angular positions of the conventionalized head 18. The crank pin 21 at the center of the transmission member, however, has been caused to travel counter-clockwise through a circular orbit represented by the dotted circle 25, from the lowest point in said orbit to the highest point therein, or in other words, through one half of the orbit. Consequently, a complete rotation of the driving shaft will cause the transmission member and the crank pin to revolve bodily through two orbital revolutions in a direction corresponding to the direction of rotation of the driving shaft. Inasmuch as the axial center of the transmission member is connected with the main driven shaft 9 by means of the crank 10 and crank pin 21, the driven shaft is caused to rotate in the same direction as the driving shaft and at twice the speed thereof.

It will be apparent that instead of being employed as a speed increasing mechanism as above described, the illustrated device may, if desired, be utilized as a speed reducing mechanism by applying the power to the shaft 9 instead of to the shaft 6. When the shaft 9 is utilized as the driving shaft, both the shaft 6 and the shaft 7 will be driven through the medium of the transmission member 8 at one half of the speed of the driving shaft.

The herein illustrated device may be utilized in connection with the armature shaft of an electric motor to increase a speed of 3600 revolutions per minute to that of 7200 revolutions per minute practically without noise or vibration of the transmission mechanism. It will be readily appreciated that the interengaging power transmitting parts of the herein described mechanism are in continuous sliding contact throughout an area of considerable extent as contrasted with the line contact only such as is effected between the abutting teeth of intermeshing gears. Consequently, the present device is not subject to any appreciable amount of wear such as would result in lost motion between its relatively moving parts or vibration of the mechanism as a whole, and consequently the present device will operate smoothly and noiselessly even after extended periods of use. The moving parts may be enclosed in a suitable casing to enable them to revolve in oil. Whether enclosed or not, a film of lubricant may be easily maintained between the contacting bearing surfaces of the device by reason of the considerable area of said surfaces. Moreover, the manufacture of the parts of the herein-described device does not require the careful machining operations such as are necessary to produce gears adapted for transmitting high speeds.

While the invention has been herein disclosed as embodied in an illustrative device, it is not intended to limit the present invention to the particular form of device herein shown, nor otherwise than as indicated by the appended claims.

Having thus described my invention, what I claim as new and desire to secure by Letters Patent of the United States is:

1. In a device of the class described, a driving shaft, a second shaft parallel to the driving shaft and spaced therefrom in an axial direction, a head carried by the driving shaft, a head carried by said second shaft, a transmission member interposed between said heads and comprising a cross-shaped portion the arms of which intersect at right angles and are disposed in a plane perpendicular to the axes of said shafts, means on one of said heads for receiving one arm of said transmission member and guiding it for lengthwise sliding movement in a plane cutting the rotational axis of said head, means on the other of said heads for receiving the other arm of said transmission member and guiding it for lengthwise sliding movement in a plane cutting the rotational axis of said head, a driven shaft having its axis disposed parallel to and located midway between the axes of said driving shaft and said second shaft, and driving connections between said transmission member and said driven shaft.

2. In a device of the class described, a driving shaft, a driven shaft parallel to the driving shaft and spaced therefrom in an axial direction, a transmission member interposed between said shafts and having sliding portions disposed at right angles to each other, members projecting from the driving shaft and from the driven shaft for cooperating with the sliding portions of the transmission member to transmit rotary motion from the driving shaft to the driven shaft, a third shaft disposed parallel to and located midway between the axes of the driving shaft and the driven shaft, and driving connections extending between the said third shaft and the center of the transmission member.

In testimony whereof I have signed my name to this specification.

GARRETT P. S. CROSS.